US005636891A

United States Patent [19]
Van Order et al.

[11] Patent Number: 5,636,891
[45] Date of Patent: Jun. 10, 1997

[54] ADJUSTABLE FASTENER

[75] Inventors: Kim L. Van Order, Hamilton; Nels R. Smith, Holland; Dean T. Miller, Wyoming, all of Mich.

[73] Assignee: Prince Corporation, Holland, Mich.

[21] Appl. No.: 472,331

[22] Filed: Jun. 7, 1995

[51] Int. Cl.⁶ .................. B60R 7/00; B60R 7/10
[52] U.S. Cl. .............. 296/37.7; 296/214; 24/295; 224/313; 248/222.11; 248/224.8; 403/13; 403/386; 411/85; 411/182
[58] Field of Search ............... 296/214, 37.7, 296/39.1, 37.8; 411/84, 85, 182; 403/13, 14, 386; 24/290–295, 297; 52/511, 716.5–716.7; 224/311, 313; 248/224.8, 222.11

[56] References Cited

U.S. PATENT DOCUMENTS

| | | | |
|---|---|---|---|
| 2,199,347 | 4/1940 | Roethel | 24/293 |
| 2,200,158 | 5/1940 | Clarke | 248/222.11 X |
| 2,227,761 | 1/1941 | Roethel | 24/293 |
| 2,598,776 | 6/1952 | Flora | 24/295 |
| 2,671,254 | 3/1954 | Meyer | 24/291 |
| 2,876,971 | 3/1959 | Poupitch . | |
| 3,037,596 | 6/1962 | Fordyce | 52/511 |
| 3,092,162 | 6/1963 | Johnsen . | |
| 3,823,526 | 7/1974 | Rose . | |
| 3,889,320 | 6/1975 | Koscik . | |
| 4,357,734 | 11/1982 | Moore | 16/125 |
| 4,630,338 | 12/1986 | Osterland et al. | 24/293 |
| 4,783,110 | 11/1988 | Beukema et al. | 296/37.7 |
| 4,867,599 | 9/1989 | Sasajima | 24/297 X |
| 4,893,866 | 1/1990 | Dowd et al. | 296/214 |
| 4,913,484 | 4/1990 | Dowd et al. | 296/97.12 |
| 4,981,323 | 1/1991 | Dowd et al. | 296/214 |
| 5,011,218 | 4/1991 | Danner et al. | 296/214 |
| 5,028,190 | 7/1991 | Loughlin, Jr. et al. | 411/182 |
| 5,046,904 | 9/1991 | Malinow | 411/15 |
| 5,104,272 | 4/1992 | Dupont et al. | 411/339 |
| 5,160,225 | 11/1992 | Chern | 411/30 |
| 5,186,517 | 2/1993 | Gilmore et al. | 296/214 |
| 5,195,793 | 3/1993 | Maki | 24/297 X |
| 5,217,337 | 6/1993 | Junemann et al. | 411/45 |
| 5,233,731 | 8/1993 | Phillips | 24/297 |
| 5,285,551 | 2/1994 | Weiland et al. | 16/125 |
| 5,288,530 | 2/1994 | Maki | 52/716.5 X |
| 5,507,610 | 4/1996 | Benedetti et al. | 24/297 X |

FOREIGN PATENT DOCUMENTS

| | | | |
|---|---|---|---|
| 105741 | 5/1987 | Japan | 24/297 |
| 785906 | 11/1957 | United Kingdom | 24/295 |

*Primary Examiner*—Dennis H. Pedder
*Attorney, Agent, or Firm*—Price, Heneveld, Cooper, DeWitt & Litton

[57] ABSTRACT

A vehicle accessory has a mounting wall with an elongated slot which slideably receives a snap-in fastener which is fixed in the orthogonal direction of installation of the snap-in fastener. The fastener cooperates with an elongated slot formed in a vehicle support structure which slot extends orthogonally to the slot in the vehicle accessory such that the fastener can be moved into alignment on two axes to align with the aperture in the vehicle for insertion of the fastener and installation of the accessory.

11 Claims, 5 Drawing Sheets

ADJUSTABLE FASTENER

BACKGROUND OF THE INVENTION

The present invention relates to a fastening system for attaching accessories to a vehicle.

When attaching accessories such as overhead consoles, grab handles and the like to a vehicle, snap-in fasteners of the type for example disclosed in U.S. Pat. No. 5,285,551 are frequently employed to allow the accessory to be snap-fitted within apertures in the vehicle supporting sheet metal at the assembly line. This facilitates installation without the utilization of tools such as screwdrivers. Thus, such accessories can be preassembled and quickly installed on the assembly line by snap-fitting the accessory into place.

One problem with the preassembly of such snap-in accessories is that the snap-in fastener and its mating aperture must be aligned to securely hold the accessory in place in a rattle-free installation. Thus, the accessory must align closely with the apertures into which it is mounted. During manufacturing, if the tolerances are slightly off of either the apertures formed in the sheet metal structure or the vehicle body or the positioning of the fasteners on the accessory, a misfit can occur which could either prevent a successful installation or provide one which is unacceptable.

Some efforts have been made to provide for such tolerance variations by, for example, employing an enlarged aperture and then shifting the accessory from the enlarged aperture to an adjoining narrowed section of the aperture which closely fits the fastener. Such an arrangement is taught in U.S. Pat. No. 5,186,517. Other efforts to provide orthogonal shifting of vehicle accessory mounting clips have been attempted in which two vertically spaced apart, orthogonally extending, rectangular slots in the sheet metal roof of the vehicle accommodate, to some extent, shifting of a snap-in fastener having multiple levels of engagement with the slots. Such a complex arrangement, however, requires two separate slots in spaced apart sheet metal sections of the vehicle support structure, which is typically not available.

Therefore, there exists a need for a snap-in vehicle mounting system in which a vehicle accessory can be readily attached to a vehicle utilizing a snap-in fastener and one which accommodates for tolerance variations so that the accessory fastener can be readily inserted into a receiving aperture for mounting the accessory to the underlying sheet metal support of a vehicle.

SUMMARY OF THE PRESENT INVENTION

The fastening system of the present invention solves the existing problem by providing a vehicle accessory with a mounting wall having an elongated slot which slideably receives a fastener which is movable along the slot but fixed to the accessory in the direction of installation of the snap-in fastener. The fastener cooperates with an elongated slot formed in a vehicle support structure which extends orthogonally to the slot in the vehicle accessory such that the fastener can be moved into alignment on two axes to align with the aperture in the vehicle for insertion of the fastener and installation of the accessory.

In the preferred embodiment of the invention, the fastener comprises a spring clip having edges along one end which are guidably supported with respect to the elongated slot formed in the vehicle accessory. The fastener is slideably held to the accessory utilizing a slide extending through the slot and attached to the fastener using a threaded fastener to preassemble the snap-in fastener to the accessory. Such a system allows preassembly of the accessory with snap-in fasteners which can be moved to align with an aperture formed in a vehicle for installation.

These and other objects, features and advantages of the present invention will become apparent upon reading the following description thereof together with reference to the accompanying drawings.

DETAILED DESCRIPTION OF THE PREFERRED EMBODIMENT

Figure 1:
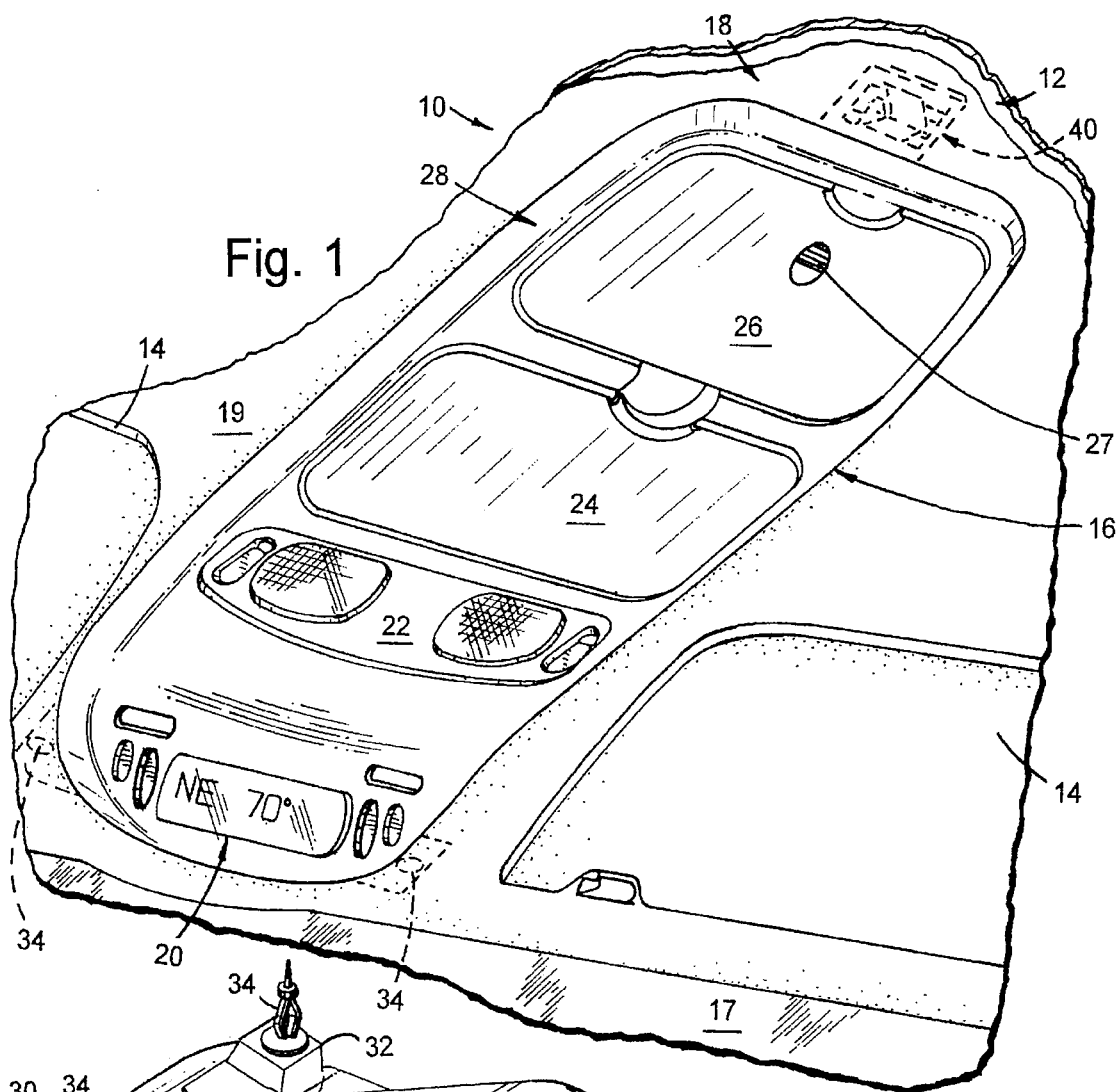
FIG. 1 is a perspective view of a vehicle including an overhead console embodying the mounting system of the present invention.

Referring initially to FIG. 1, there is shown a vehicle 10, such as an automobile, which includes a sheet metal roof 12 and various support beams underlying the roof which are employed for holding a variety of vehicle accessories, such as visors 14 and an overhead console 16. Covering the sheet metal roof 12 and support structure associated therewith is a headliner 18 which is molded of a suitable composite material covered by an upholstery fabric 19 to conform to the interior of the vehicle.

The visors 14 are mounted above the windshield 17 of the vehicle in a conventional manner, while console 16 embodies the mounting system of the present invention. Console 16 may include a digital electronic compass 20 of the type described in U.S. Pat. No. 4,953,305. This compass provides a digital readout of the vehicle's direction as well as the ambient temperature. Console 16 may also include a map lamp subassembly 22 providing light directable to either the driver or passenger side, a sunglass storage compartment 24 and a garage door opening storage compartment 26 having an actuator panel 27 for actuating a conventional garage door transmitter mounted within the storage compartment.

The console 16 and its components are mounted within a housing 28 utilizing conventional snap-in integrally molded tabs and mating slots or other conventional fastening techniques to easily install the console to housing 28.

Housing 28 is an elongated, generally rectangular pan-shaped housing with flange 29 extending around the periphery thereof. At the forward end of the housing is a pair of mounting bosses 30, 32, which include slots 31 extending from an edge of the bosses for slidably receiving conventional anchor fasteners 34 which extend through circular apertures in the vehicle roof support 12 for temporarily holding the console in place until such time as screws are inserted into the fasteners 34 which expand to lock the forward end of console 28 to the vehicle roof. A rearwardly projecting, generally horizontal mounting flange 25 extends from the rear edge of console 28 and includes a mounting assembly 40 embodying the present invention. Assembly 40 is shown in greater detail in FIG. 3 which is now described.

Figure 3:
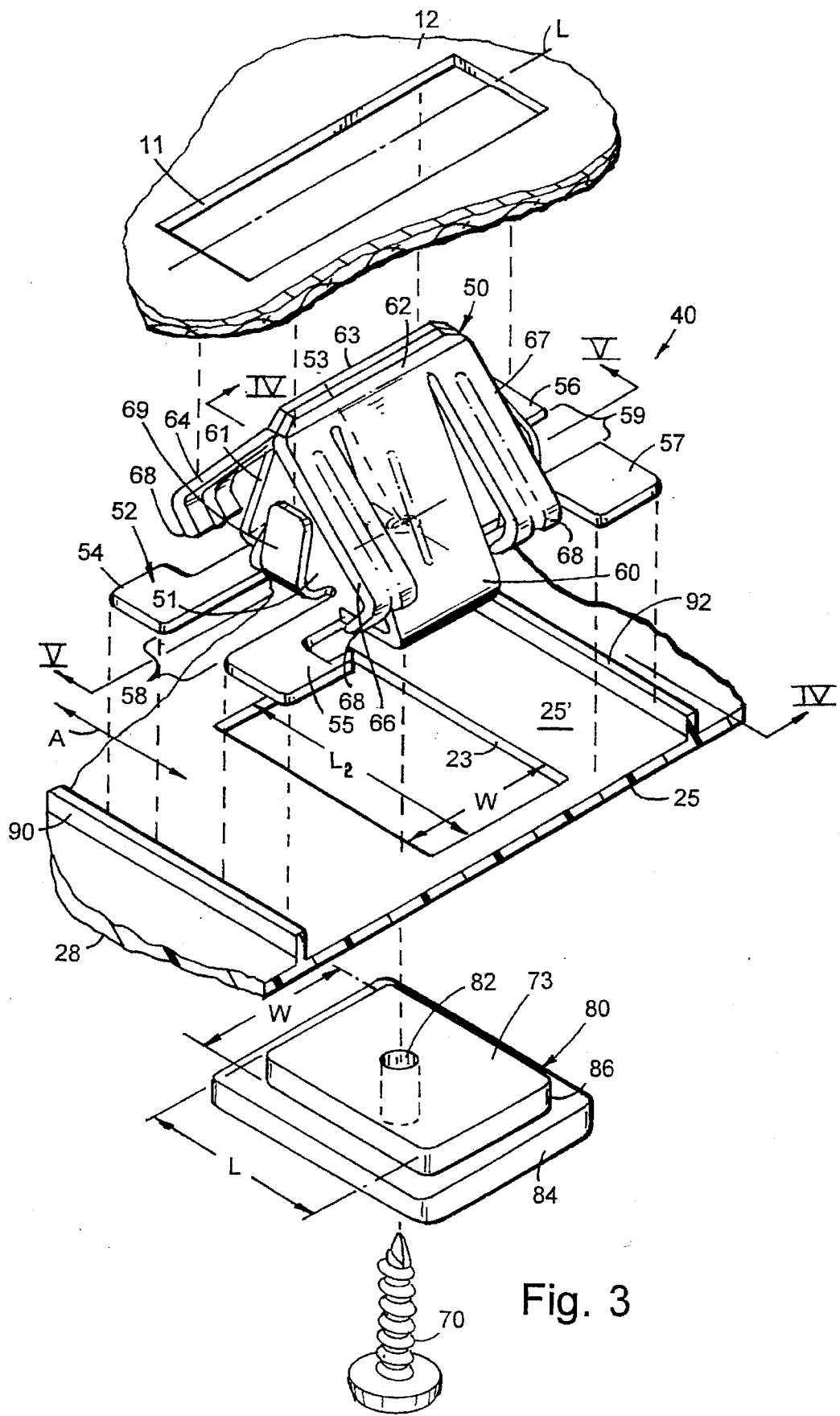
FIG. 3 is a greatly enlarged, exploded, fragmentary perspective view, partially in cross section, showing the mounting structure embodying a first embodiment of the present invention.
Figure 4:
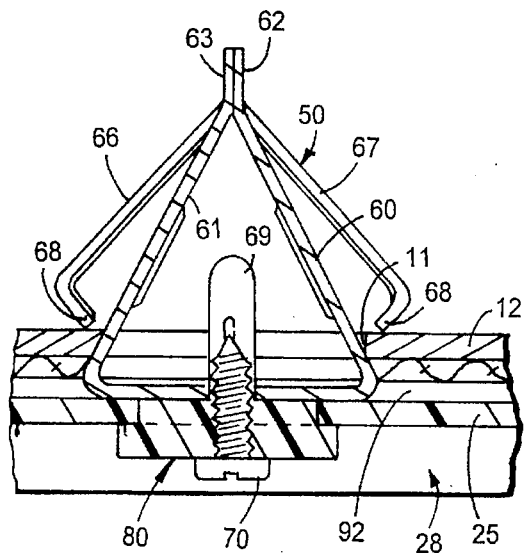
FIG. 4 is a cross-sectional view of the mounting assembly in FIG. 3 shown in an installed position and taken along section lines IV—IV of FIG. 3.
Figure 5:
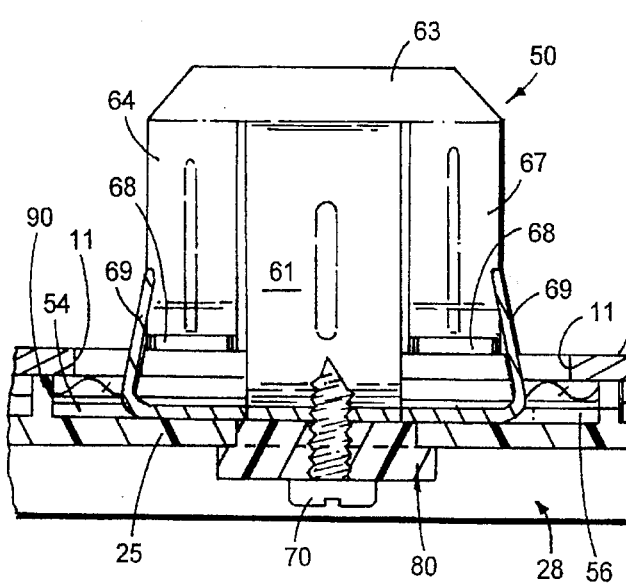
FIG. 5 is a cross-sectional view of the structure shown in FIG. 3 in an assembled position taken along section lines V—V of FIG. 3.

As seen in FIG. 3, mounting assembly 40 includes a spring steel fastening clip 50 having a generally H-shaped face surface 52 including a central body 51 through which there is formed an aperture 53 for receiving a threaded fastener such as a screw 70. Surface 51 includes four pad-shaped legs, 54, 55, 56 and 57. Aligned outer edges 58 and 59 are associated with legs 54, 55 and 56, 57, respectively. These edges are guidably held between guide means as described below when the clip is mounted to housing 28. Clip 50 further includes a pair of upwardly convergent legs 60, 61 extending from the central body 51 and terminating along top, generally vertical edges 62, 63, respectively. At opposite ends of each of the edges 62, 63 there are downwardly and inwardly divergent legs 64, 65, 66 and 67, each of which include an inwardly projecting tip 68, as best seen in FIGS. 4 and 5. Clip 50 also includes end tabs 69 upwardly and inwardly projecting between legs 60, 61 from the central section 51 of the clip.

Lower facing surface of central section 51 is generally rectangular and aligns with an elongated, rectangular aperture 23 in flange 25 and abuts the facing surface 73 of a lubricous polymeric slide 80. Slide 80 has a central aperture 82 for receiving fastening screw 70 which secures the slide to fastener 50. Slide 80 includes an enlarged, rectangular body 84 with a smaller rectangular plateau 86 formed thereon having a top rectangular surface 73 which corresponds to the general size and shape of the lower surface of central section 51 of clip 50. Rectangular plateau 86 has a width $W_1$ in FIG. 3 slightly less than the width $W_2$ of slot 23. Its length $L_1$, however, is significantly less than length $L_2$ of slot 23, as seen in FIG. 3, such that when screw 70 is extended through aperture 82 and couples clip 50 to the slide 80, the clip 50 and slide 80 can slide along a portion of the length $L_2$ of slot 23 as indicated by arrow A in FIG. 3.

Figure 2:
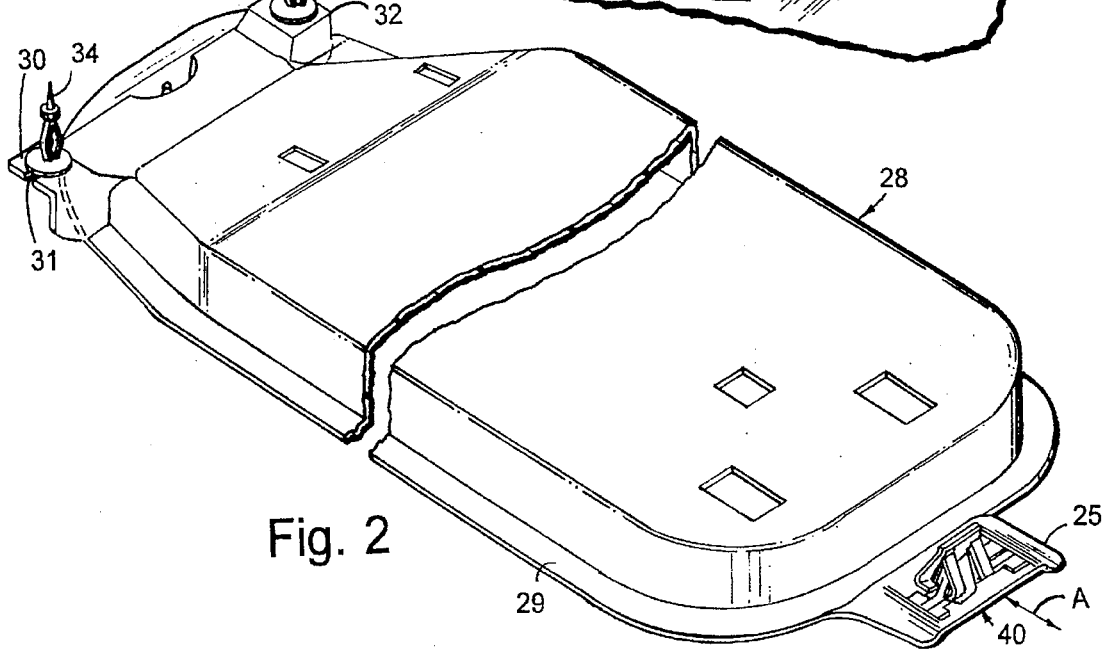
FIG. 2 is a top perspective view of the console shown in FIG. 1 showing the mounting structure embodying the present invention.

Extending upwardly from the upper surface 25' of flange 25 is guide means comprising a pair of parallel rails 90, 92 spaced apart a distance substantially equal to the distance between the edges 58, 59 of the legs extending from the central section of clip 50, such that clip 50 remains in substantially the same alignment shown in FIGS. 2 and 3, and can be moved in a direction indicated by arrow A in FIGS. 2 and 3 sliding within slot 23. The height of plateau 86 associated with slide 80 is slightly greater than the thickness of flange 25 such that relatively easy sliding motion is achieved. In one embodiment, the length $L_2$ of slot 23 was twice the length of $L_1$ of slide 80.

Clip 50 extends from the upper surface 25' of flange 25 pointing in a direction toward elongated rectangular mounting aperture 11 formed in roof support member 12. Aperture 11 has a longitudinal axis L extending orthogonally to the longitudinal axis of aperture 23 in flange 25 to allow spring clip 50 to be inserted along the length of the rectangular aperture to accommodate alignment tolerance variations between the positioning of clip 50 with respect to flange 25 in a direction along the length $L_2$ of aperture 23 and the mounting aperture 11 formed in the vehicle roof. Thus, the width of the slot 11 along the longitudinal axis L is greater than the distance between the outer edges of legs 69 of clip 50 such that the clip can be inserted at a variety of locations within aperture 11 along axis L.

By providing a sliding mounting of clip 50 to console 16, the clip can be aligned with the centerline of slot 11 to accommodate for tolerance differences in the relationship of the console and roof mounting aperture, while the elongated slot 11 accommodates for variations in an orthogonal direction. The console housing 28 is mounted to the vehicle roof first by inserting fasteners 34 into mating apertures in the vehicle roof and subsequently swinging the rearward end of the console upwardly until the spring clip 50, which includes tapered legs 64, 68, aligns with slot 11 and self-centers the clip with respect to aperture 11. It is then pushed upwardly until it snap-locks into position. In this position, the inwardly tapered ends 68 of the clip 50 engage the upper surface of roof member 12, as seen in FIG. 4. This supplies a compressive force for holding the housing to the roof structure member and prevents further sliding motion of slide 80 or fastener 50, thereby locking the console in position. Fastening screws associated with fasteners 34 then can be tightened to complete the installation. In some embodiments, the console itself will include one or more fastener assemblies 40 and mount directly to roof 12.

Figure 7:
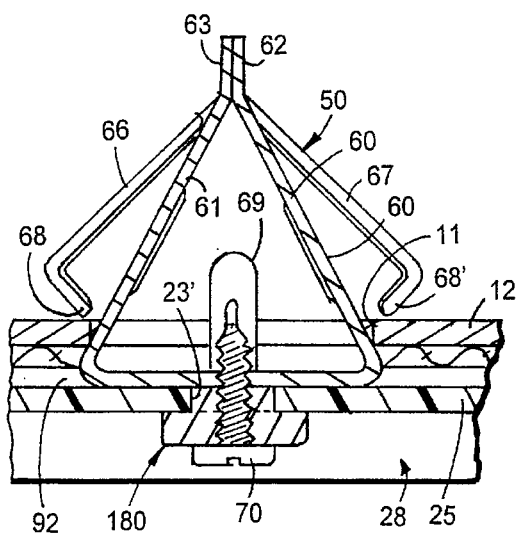
FIG. 7 is a cross-sectional view of the mounting assembly in FIG. 6 shown in an installed position and taken along section lines VII—VII of FIG. 6.
Figure 8:
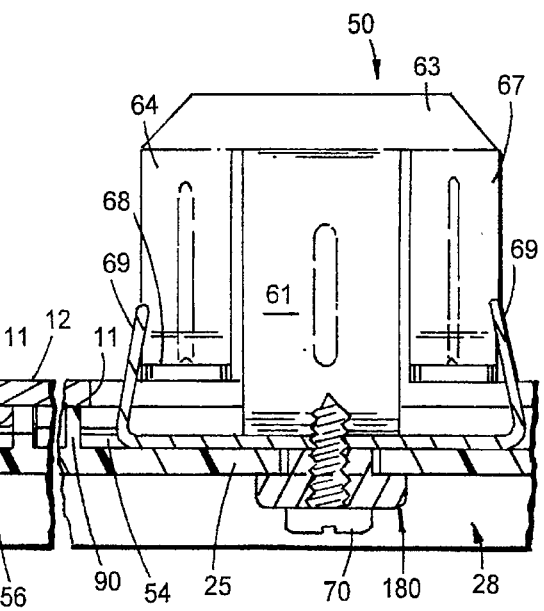
FIG. 8 is a cross-sectional view of the structure shown in FIG. 3 in an assembled position taken along section lines VIII—VIII of FIG. 6.
Figure 6:
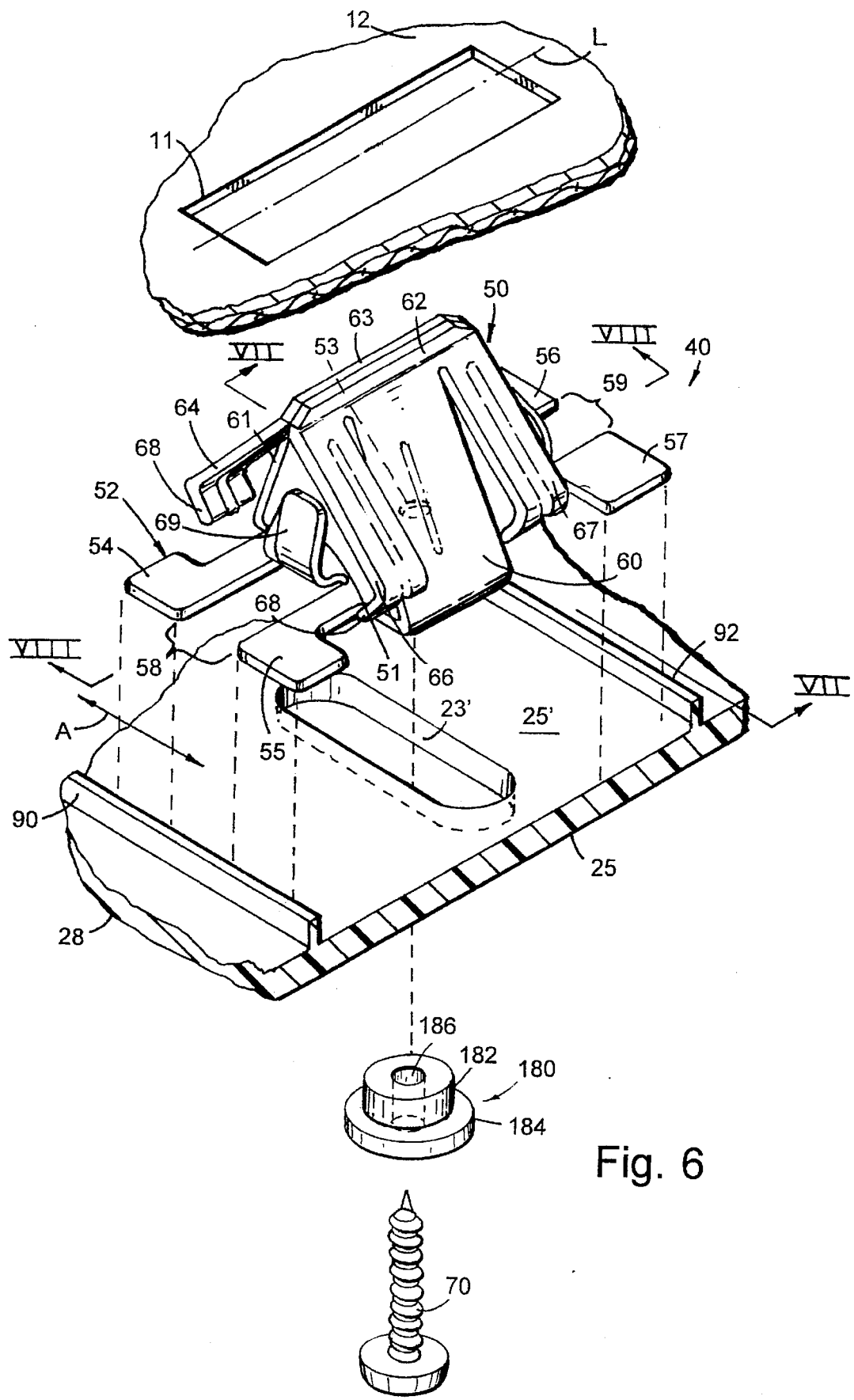
FIG. 6 is an enlarged, exploded, fragmentary perspective view, partially in cross section, of an alternative embodiment of the invention.

An alternative embodiment of the slide member is shown in FIGS. 6-8 in which slide 80 is replaced with a ferrule 180 with the remaining comparable parts identified by the same reference numerals as in the previous embodiment. Flange 25 includes an elongated, oval-shaped slot 23' as opposed to a rectangular slot which has a width slightly greater than the diameter of the cylindrical body 182 of ferrule 180 which includes a disk-shaped head 184 of a larger diameter and a central aperture 186 through which fastener 70 extends. Ferrule 180 has a height slightly greater than the thickness of flange 25 such that when fastener 70 is secured to clip 50, the clip can slide along the longitudinal axis of slot 23' as in the first embodiment for self-aligning clip 50 with aperture 11 in the vehicle roof 12 for mounting the console to the vehicle roof. This embodiment provides a greater range of adjustment since slot 23' is about four times the diameter of ferrule 180. Thus, such a mounting structure cannot only accommodate manufacturing tolerance, it can be used to mount a console to different vehicles which have mounting apertures which align within the length of slot 23'.

Figure 9:
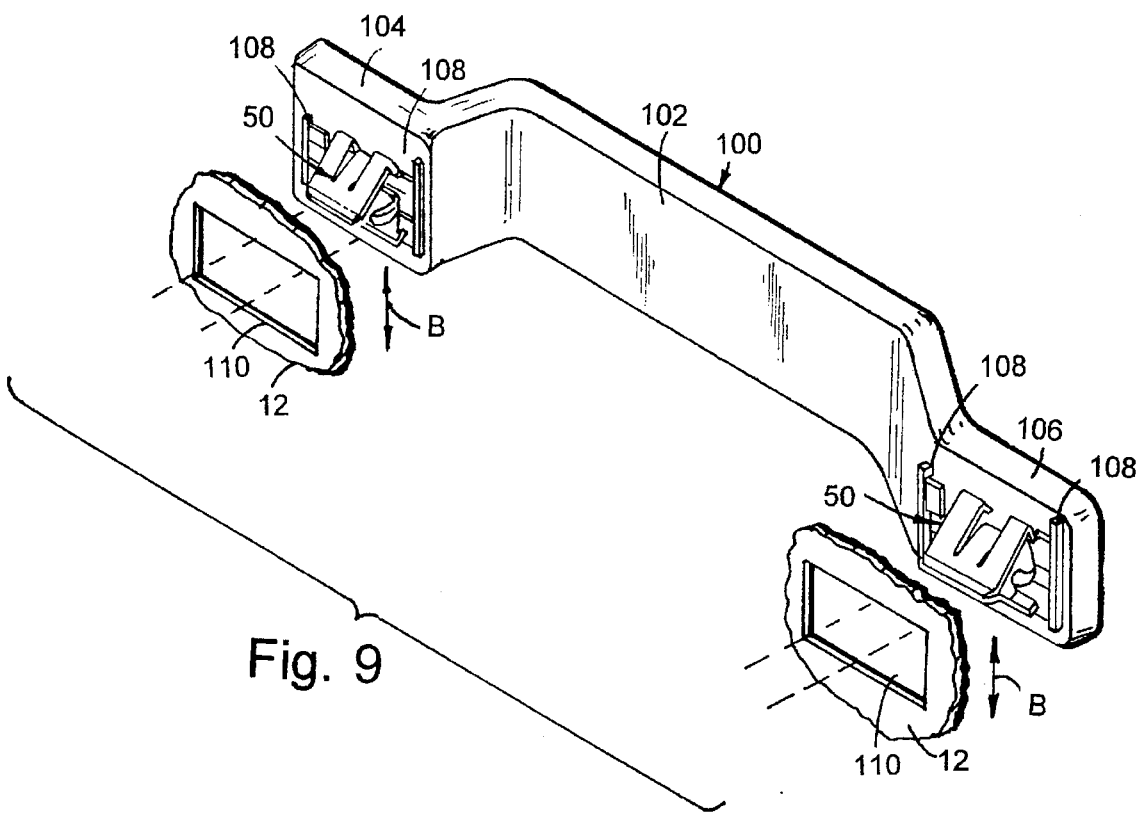
FIG. 9 is a fragmentary, exploded, perspective view, partially in cross section, of an assist handle embodying the mounting system of the present invention.

The same sliding clip mounting arrangement can be employed in connection with an assist strap or grab handle 100, shown in FIG. 9, in which the assist strap has a central body 102 with upwardly and outwardly projecting ends 104, 106. A spring clip 50 is mounted to each of the ends 104, 106 utilizing the same mounting structure as shown in FIGS. 2-5 or 6-8, such that clip 50 can adjustably move vertically in a direction indicated by arrow B in FIG. 9 between spaced, parallel guide rails 108 on each of the ends 104, 106, respectively. A fastening screw extends through the ends 104, 106 into clip 50, as in the previous embodiments, and either a slide 80 or a ferrule 180 is employed to provide the sliding mount of a clip 50 to each of the ends of the assist strap. The clips extend within horizontally elongated apertures 110, 112 formed in the sheet metal support structure 12 of the vehicle, typically above the passenger's and driver's side windows for assisting in the ingress and egress to and from the vehicle.

Figure 10:
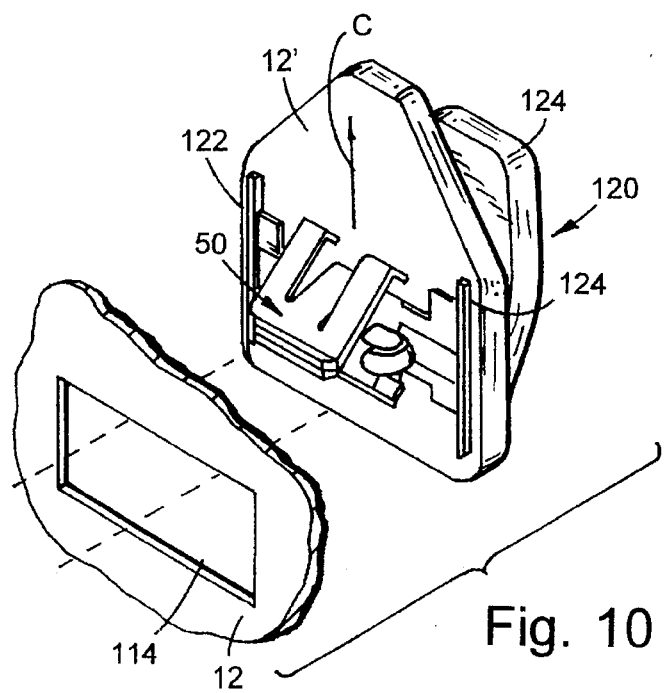
FIG. 10 is a perspective, exploded view, partially in cross section, of a hook embodying the mounting system of the present invention.

A similar mounting arrangement can be employed for a clothing hook 120, shown in FIG. 10, which also includes a spring clip 50 mounted between parallel, spaced-apart guide rails 122 and 124 mounted to the rear surface 121 of the hook 120 which includes an outwardly and upwardly extending hook member 126 for receiving clothing hooks or the like. Clip 50 moves vertically, as indicated by arrow C in FIG. 10, to allow the clip to self-align within an horizontally elongated aperture 114 in the sheet metal support member 12 of the vehicle. A fastening screw extends through the body of hook 120, and a guide member 80 or ferrule 180 extends through a vertically elongated slot to allow the clip 50 to move in a direction indicated by arrow C and yet allow the clip 50 to snap into the aperture 114 for mounting the hook 120 to the vehicle. Suitable decorative covers cover the threaded fasteners and slides in the embodiments shown in FIGS. 9 and 10 from the inside facing surface of such accessories.

It will become apparent to those skilled in the art that these and other applications of the mounting system of the present invention and modifications to the preferred embodiment described herein can be made without departing from the spirit or scope thereof as defined by the appended claims.

The embodiments of the invention in which an exclusive property or privilege is claimed are defined as follows:

1. A vehicle accessory and fastener for attaching said accessory to a vehicle support member comprising:

a vehicle accessory having a mounting wall, said wall including an elongated generally rectangular slot formed therethrough, said slot having a longitudinal axis;

a fastener comprising a body having legs for lockably inserting said fastener into an aperture in a vehicle support member, said fastener slidably positioned on a first side of said wall; and a slide for slideably mounting said fastener to said wall from a side of said wall opposite said first side, said slide including a section extending through said elongated slot such that said fastener can be moved to align with the aperture in a vehicle support member during installation of said vehicle accessory.

2. The accessory and fastener as defined in claim 1 wherein said first side of said wall includes a pair of spaced apart parallel rails extending on opposite sides of said elongated slot and wherein said fastener slideably engages said rails.

3. The accessory and fastener as defined in claim 2 and further including a threaded fastener extending through said slide and said elongated slot for coupling said slide to said first named fastener.

4. The accessory and fastener as defined in claim 3 wherein said first named fastener comprises a spring clip and said legs comprises a pair of spring legs which snap into the aperture in a vehicle support member.

5. The accessory and fastener as defined in claim 1 wherein said accessory is an overhead console.

6. The accessory and fastener as defined in claim 1 wherein said accessory is an assist handle.

7. The accessory and fastener as defined in claim 1 wherein said accessory is a hook.

8. A vehicle accessory and a fastener for attaching said vehicle accessory to a vehicle support member comprising:

a vehicle accessory having a mounting wall including an elongated closed end slot, a guide track on said wall for slideably holding a fastener in alignment with said slot when said fastener is positioned adjacent a surface of said wall, said guide track extending in generally parallel relationship to the longitudinal axis of said slot;

a fastener comprising a body slideably engaging said guide track for allowing said fastener to slide along said slot, said fastener including leg means for lockably inserting said fastener into an aperture in a vehicle support member; and a slide positioned on a side of said mounting wall opposite said fastener and having a segment slideably extending through said elongated slot, and a threaded fastener securing said slide to said first named fastener to allow said first named fastener to slide along said guide track and be held to said accessory.

9. The accessory and fastener as defined in claim 8 wherein said guide track comprises a pair of spaced apart parallel rails extending on opposite sides of said elongated slot.

10. The vehicle accessory as defined in claim 8 wherein said segment is generally rectangular.

11. The vehicle accessory as defined by claim 10 wherein said segment is generally circular.

* * * * *